US009256502B2

(12) United States Patent
Nandam et al.

(10) Patent No.: US 9,256,502 B2
(45) Date of Patent: Feb. 9, 2016

(54) METHOD AND SYSTEM FOR INTER-PROCESSOR COMMUNICATION

(75) Inventors: Narendra C. Nandam, Fremont, CA (US); Vincent Paul Graham, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 890 days.

(21) Appl. No.: 13/526,738

(22) Filed: Jun. 19, 2012

(65) Prior Publication Data
US 2013/0339794 A1    Dec. 19, 2013

(51) Int. Cl.
*G06F 13/00* (2006.01)
*G06F 13/24* (2006.01)
*G06F 13/32* (2006.01)
*G06F 11/22* (2006.01)

(52) U.S. Cl.
CPC .................................. *G06F 11/2284* (2013.01)

(58) Field of Classification Search
CPC . G06F 9/4812; G06F 9/3877; G06F 11/3404; G06F 11/3471
USPC .................. 710/104, 269, 260, 268; 711/202, 711/E12.002
See application file for complete search history.

(56) References Cited

U.S. PATENT DOCUMENTS

| | | | | |
|---|---|---|---|---|
| 4,631,666 A | * | 12/1986 | Harris et al. | 709/217 |
| 6,199,142 B1 | * | 3/2001 | Saulsbury et al. | 711/118 |
| 7,386,628 B1 | * | 6/2008 | Hansell et al. | 709/238 |
| 7,475,397 B1 | * | 1/2009 | Garthwaite et al. | 718/101 |
| 2007/0009098 A1 | * | 1/2007 | Tanaka | H04L 1/242 380/30 |
| 2008/0189719 A1 | * | 8/2008 | Shimizuno | 719/312 |
| 2008/0266948 A1 | * | 10/2008 | Jang | G11C 11/5628 365/185.03 |
| 2009/0006800 A1 | * | 1/2009 | Bellofatto et al. | 711/170 |
| 2009/0080233 A1 | * | 3/2009 | Tsui | G11C 17/14 365/100 |
| 2010/0106692 A1 | * | 4/2010 | Moloney | 707/693 |
| 2010/0122150 A1 | * | 5/2010 | Tsutsui | G06F 11/1016 714/801 |
| 2010/0180083 A1 | * | 7/2010 | Lee | G06F 12/0846 711/128 |
| 2010/0191894 A1 | * | 7/2010 | Bartley | G06F 11/201 711/5 |
| 2012/0151232 A1 | * | 6/2012 | Fish, III | 713/322 |
| 2012/0254552 A1 | * | 10/2012 | Yiu | G06F 12/04 711/154 |
| 2013/0086449 A1 | * | 4/2013 | Giovannini | G06F 11/1044 714/763 |
| 2013/0117620 A1 | * | 5/2013 | Joo | G11C 16/10 714/746 |
| 2013/0155794 A1 | * | 6/2013 | Wu | G11C 29/802 365/200 |
| 2013/0176788 A1 | * | 7/2013 | Kim | G11C 16/06 365/185.18 |
| 2013/0283126 A1 | * | 10/2013 | Ramaraju | G06F 11/1064 714/763 |
| 2014/0068125 A1 | * | 3/2014 | Pullagoundapatti | G06F 13/00 710/110 |

* cited by examiner

*Primary Examiner* — Faisal M Zaman
(74) *Attorney, Agent, or Firm* — Osha Liang LLP

(57) ABSTRACT

A system including a DCU with a DMS located on the first node, where the DMS is associated with an interrupt receive register. The system further includes a second DCU located on second node that includes a GMS located on the second node, where the GMS is associated with an interrupt dispatch register. The GMS is configured to identify the DMS, determine a payload to transmit to DMS, issue cross-calls using the interrupt dispatch register, where a cross-call is issued for each non-zero bit in the payload, and issue a cross-call including a completion vector. The DCU is configured to receive the cross-calls from the GMS, in response to each of the cross-calls, set a corresponding bit-location in the second interrupt receive register to one, and after receiving the completion vector, use a current state of the interrupt receive register to determine a physical address.

13 Claims, 6 Drawing Sheets

METHOD AND SYSTEM FOR INTER-PROCESSOR COMMUNICATION

BACKGROUND

When a system powers on the system typically performs a Power-on Self-test (POST) and executes some initial configuration programs. During the initial phase of POST, various components, such as processors belonging to remote DCUs, are unable to communicate with each other.

SUMMARY

In general, in one aspect, the invention relates to a system. The system includes a first distributed computing unit (DCU) comprising a first node, and a first DCU master strand (DMS) located on the first node, wherein the first DMS is associated with a first interrupt receive register. The a second DCU comprises a second node, a global master strand (GMS) located on the second node, wherein the GMS is associated with an interrupt dispatch register, and a DCU global memory comprising first power-on self test (POST) code at a first physical address, wherein the GMS is configured to: identify the first DMS, determine an address for the first DMS, determine a payload to transmit to at least the first DMS using at least the first physical address, wherein the payload comprises a sequentially ordered set of bits, wherein at least two bits in the payload are non-zero, select a first non-zero bit in the payload to send to the first DMS, determine a first bit-location of the first non-zero bit in the payload, program the interrupt dispatch register with the first bit-location to obtain a first programmed interrupt dispatch register, issue a cross-call comprising the first bit-location to the address using the first programmed interrupt dispatch register, select a second non-zero bit in the payload to send to the first DMS, determine a second bit-location of the second non-zero bit in the payload, program the interrupt dispatch register with the second bit-location to obtain a second programmed interrupt dispatch register, issue a cross-call comprising the second bit-location to the first address using the second programmed interrupt dispatch register, after all non-zero bits in the payload have been transmitted to the first DMS, program the interrupt dispatch register with a completion vector to obtain a third programmed interrupt dispatch register, and issue a cross-call comprising the completion vector to the first address using the third programmed interrupt dispatch register, wherein the first DMS is configured to set the first bit-location in the first interrupt receive register to one, set the second bit-location in the first interrupt receive register to one, and after receiving the completion vector, use a current state of the first interrupt receive register to determine the first physical address.

In general, in one aspect, the invention relates to, a system, comprising a first distributed computing unit (DCU) comprising a first node, and a first DCU master strand (DMS) located on the first node, wherein the first DMS is associated with a first interrupt receive register, a second DCU comprising: a second node, a global master strand (GMS) located on the second node, wherein the GMS is associated with an interrupt dispatch register, and a DCU global memory comprising first power-on self test (POST) code and a memory mailbox structure at a physical address, wherein the GMS is configured to: identify the first DMS, determine an address for the first DMS, determine a payload to transmit to at least the first DMS using at least the first physical address, wherein the payload comprises a sequentially ordered set of bits, wherein the payload comprises at least one non-zero bit, issue a plurality of cross-calls using the interrupt dispatch register to the address, wherein one of the plurality of cross-calls is issued for each non-zero bit in the payload, and issue a cross-call comprising a completion vector, wherein the first DCU is configured to: receive the plurality of cross-calls from the GMS, in response to each of the plurality of cross-calls, set a corresponding bit-location in the second interrupt receive register to one, after receiving the completion vector, use a current state of the second interrupt receive register to determine the physical address.

Other aspects of the invention will be apparent from the following description and the appended claims.

DETAILED DESCRIPTION

Figure 1:
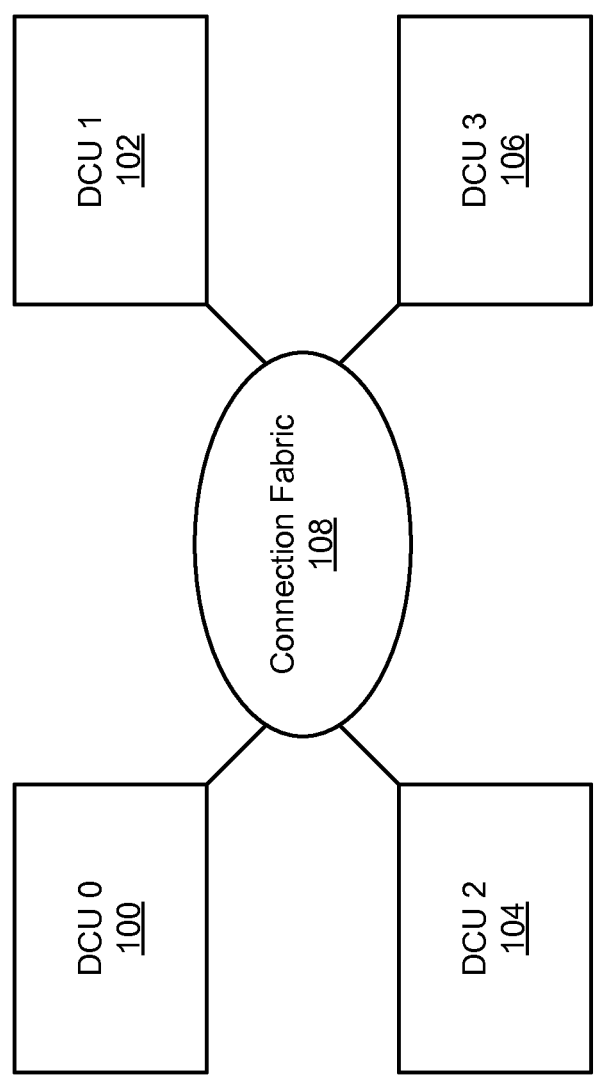
FIGS. 1-2 show systems in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to enabling communication between processors in a system during execution of the power-on self-test (POST) code. More specifically, embodiments of the invention overload one or more registers in the system to communicate a physical address of the location of POST code executing on the global master strand (GMS). Further, one or more embodiments of the invention overload one or more registers in the system to communicate a physical address of the location of the memory mailbox structure that is set up in the distributed computing unit (DCU) global memory by the GMS.

FIG. 1 shows a system in accordance with one or more embodiments of the invention. As shown in FIG. 1, the system includes multiple distributed computing units (DCUs) (100, 102, 104, 106). Each DCU may be operatively connected to one or more other DCUs. In one embodiment of the invention, the DCUs are connected to each other using a connection fabric (108). The connection fabric may be implemented using any wired and/or optical connection mechanism. For example, the connection fabric may be implemented using one or more crossbar switches, one or more communication buses, or any combination thereof. In one or more embodiments of the invention, the system does not include any shared memory that is external to the DCUs. Additional detail about the DCUs is described in FIG. 2. Those skilled in the art will appreciate that the invention is not limited to the system configuration shown in FIG. 1. For example, embodiments of the invention may be implemented with greater or fewer DCUs. Further, while the system shown in FIG. 1 includes a single connection fabric, embodiments of the invention may be implemented using multiple separate connection fabrics.

Figure 2:
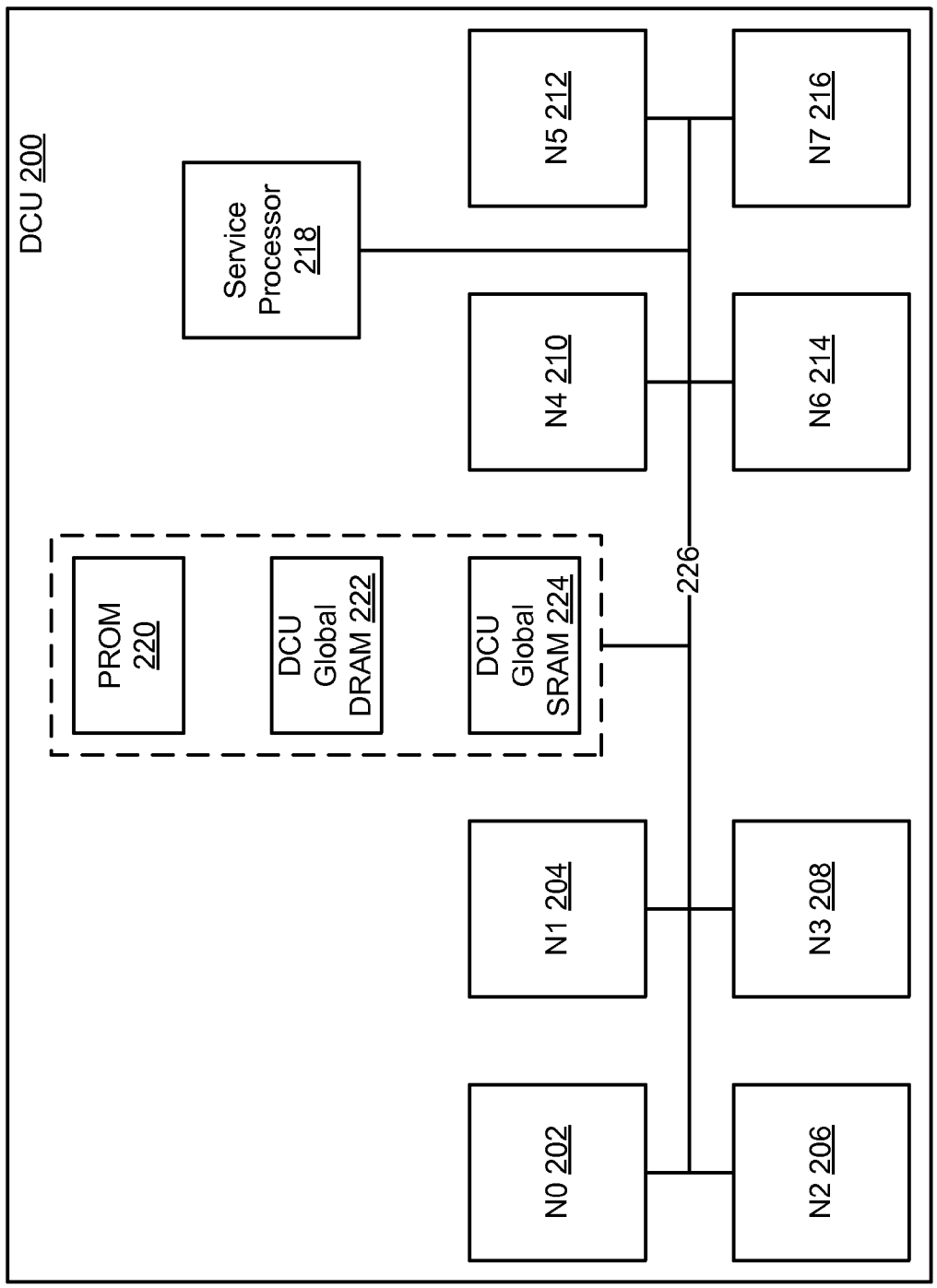

FIG. 2 shows a DCU in accordance with one or more embodiments of the invention. As shown in FIG. 2, the DCU (200) includes one or more nodes (202, 204, 206, 208, 210, 212, 214, 216), a service processor (218), a programmable read-only memory (PROM) (220), DCU global dynamic random access memory (DRAM) (222), DCU global static random access memory (SRAM) (224), and a communication means (226). Each of these components is described below.

In one embodiment of the invention, the system include multiple nodes (202, 204, 206, 208, 210, 212, 214, 216) each operatively connected to at least one other node in the system via the communication means (226). In one embodiment of the invention, each node (202, 204, 206, 208, 210, 212, 214, 216) includes one or more virtual CPUs. For example, each node may include six cores where each core includes eight virtual CPUs. The number of virtual CPUs in each node does not need to be the same for each node in the system. Further, the number of virtual CPUs in a given node may vary based on the implementation of the invention without departing from the invention.

In one embodiment of the invention, the PROM (220) may include, for example, host-config code, POST code, hypervisor code, and open boot code. In one or more embodiments of invention, the host-config code, the POST code, the hypervisor code, and the open boot code are executed by one or more processors located in one or more nodes in the system. Host-config code, when executed, is used to initialize various hardware components on the system including, for example, the nodes, memory (222, 224), etc. POST code, when executed, performs diagnostics on the system hardware after the system is powered on but before the hypervisor and/or open boot code is executed. In one embodiment of the invention, the host-config code, when executed, performs the selection of the Global Master Strand (GMS). More specifically, in one embodiment of the invention, the lowest numbered active DCU is chosen as a golden DCU and its DMS is chosen as the Global Master Strand. Once the GMS is selected, host-config creates and/or updates a mailbox interface structure on DCUs, where the mailbox interface structure includes a listing of all DMSs in the system along with a pointer to a NULL reference for all DMSs except the DMS that is designated as the GMS. Continuing with the discussion of FIG. 2, in one embodiment of the invention the hypervisor code, when executed, virtualizes the system hardware for use by the programs and operating systems executing the system. The open boot code, when executed, provides interfaces to the system hardware for use by the operating system. In one embodiment of the invention, each node may have different contents in its PROM. Further, each node may include a different version of the POST code.

In one embodiment of the invention, the service processor (218) provides a basic user interface to enable the user to power on the system and to configure the system (or portions thereof). In addition, the service processor (218) includes functionality to update the PROM.

In one embodiment of the invention, the DCU global dynamic random access memory (DRAM) (222) is accessible by all nodes in the DCU and by nodes in remote DCUs during the glued phase and is configured to temporarily store at least the POST code for execution by the one or more processors in the system. In one embodiment of the invention, the DCU global DRAM is in the cacheable space. Said another way, the DCU global DRAM does not include any cached data structures or store any data that is cached during the executing of code (including operating system code and application code) by the processors. Another type of volatile memory may be used in place of DRAM without departing from the invention.

In one embodiment of the invention, the DCU global static random access memory (SRAM) (224) is accessible by all nodes in the DCU and is configured to temporarily store data that is cached during the executing of code (including operating system code and application code) by the processors. Another type of volatile memory may be used in place of SRAM without departing from the invention.

In one embodiment of the invention, the communication means (226) includes hardware configured to enable communication between the various components in the system. Examples of communication means include, but are not limited to, cross-bar switch(es) and communication bus(es).

Those skilled in the art will appreciate that the invention is not limited to the configuration shown in FIG. 2. Further, the host-config code, the POST code, the hypervisor code, and the open boot code may be stored in other memory locations within the system instead of the PROM without departing from the invention.

Figure 3:
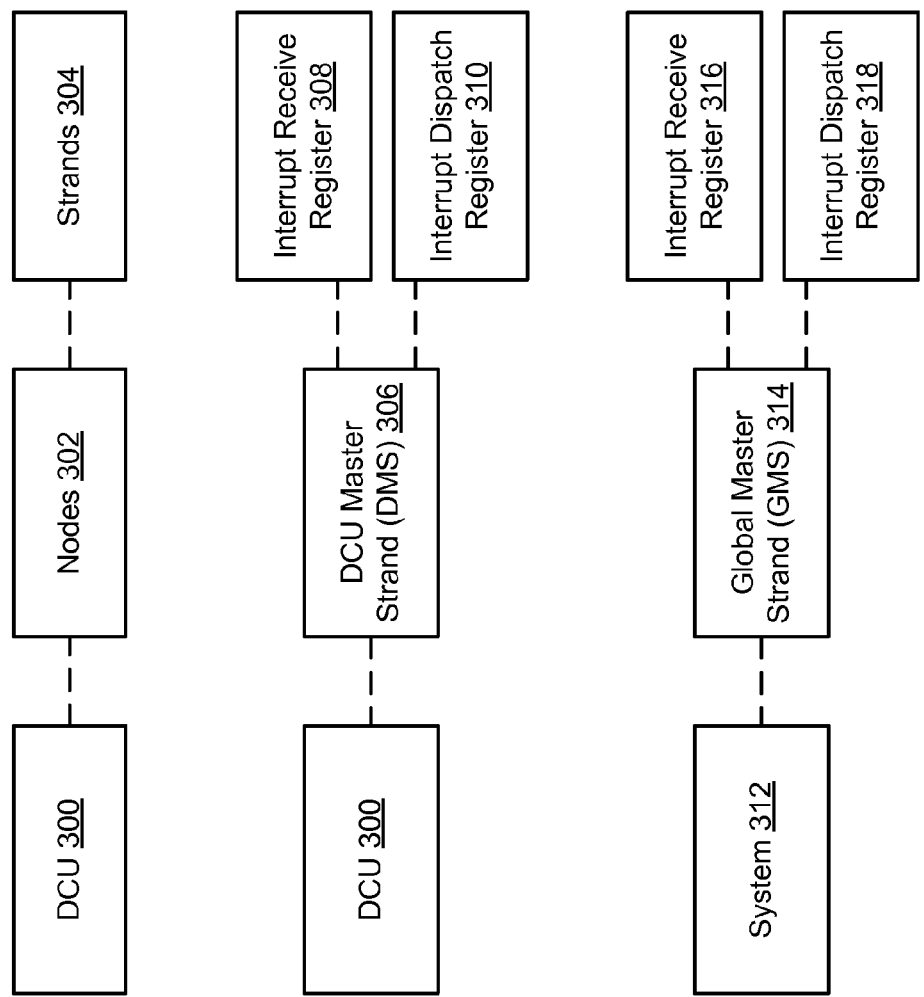
FIG. 3 shows the relationship of various components in the system.

FIG. 3 shows the relationship of various components in the system. As shown in FIG. 3, each DCU (300) is associated with (or includes) one or more nodes (302). Further, each node (302) includes one or more strands (304) (also referred to a virtual CPU). In one embodiment of invention, a strand corresponds to the hardware state that must be maintained in order to execute a software thread. As discussed above, each node includes one or more processors. The processor(s) within the node execute the software threads corresponding to the strands.

In one embodiment of the invention, each DCU (300) is associated with a DCU master strand (DMS) (306), where the DMS (306) is one of the strands (304) in the corresponding DCU (300). Further, each DMS (306) (which is also referred to as a virtual CPU) is associated with an interrupt receive register (308) and an interrupt dispatch register (310). In one embodiment of the invention, the interrupt dispatch register has a width of six bits and the interrupt receive register has a width of sixty-four bits. In one embodiment of the invention, the interrupt dispatch register is a write-only register. Each bit in the interrupt receive register may be in one or two states: set or cleared. In one embodiment of the invention, when a read is performed on a bit that is in a "cleared" state, the result of the read is 0. When a read is performed on a bit that is in a "set" state, the result of the read is that the bit will be cleared in the interrupt receive register.

In one embodiment of the invention, the system (312) includes one global master strand (GMS). The GMS (314) is selected from the DMSs in the system. Accordingly, GMS (314) is associated with an interrupt receive register (316) and an interrupt dispatch register (318).

Figure 4:
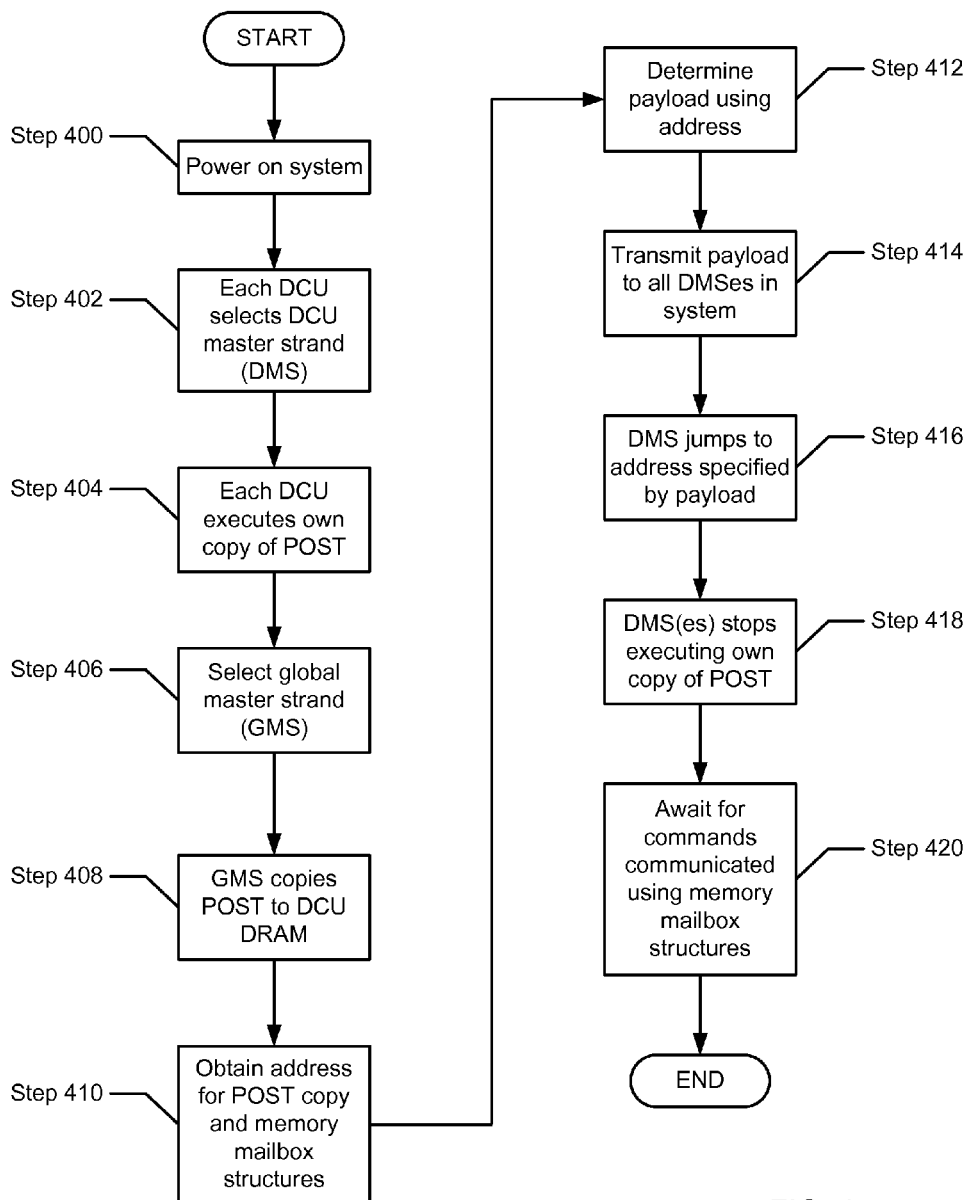
FIGS. 4 and 5 show flowcharts in accordance with one or more embodiments of the invention.
Figure 5:
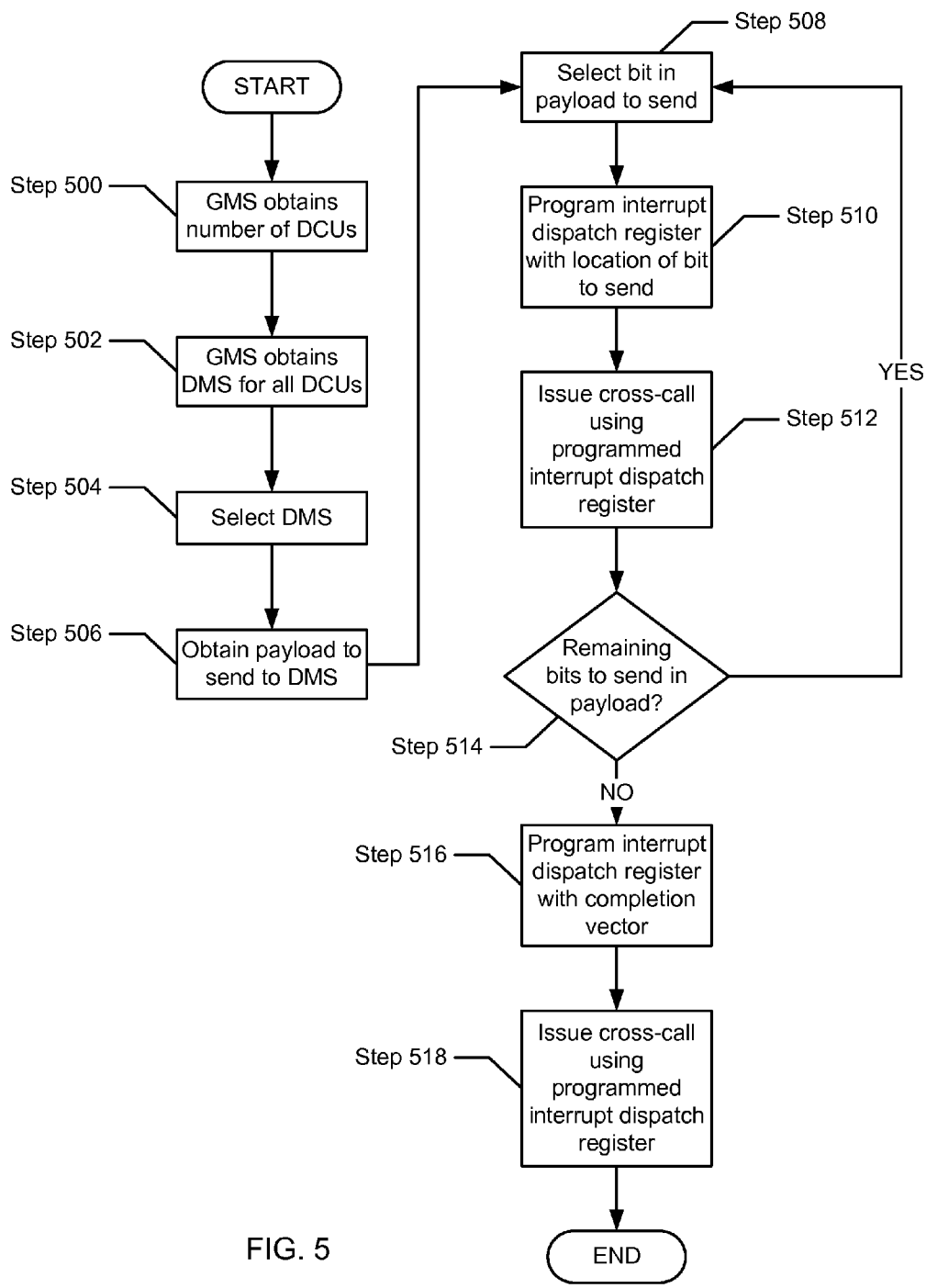

FIGS. 4 and 5 show flowcharts in accordance with one or more embodiments of the invention. More specifically, FIGS. 4 and 5 show a method for enabling communication between DCUs in a system in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

Turning to FIG. 4, in step 400 system is powered-on. At this stage, each DCU loads its own copy of the POST code from its PROM into the DCU global DRAM. In one embodiment of the invention, the aforementioned copies of the POST code may not be identical. Once loaded, the glueless phase of POST begins. In the glueless phase each DCU within the system independently executes its own copy of the POST code. In step 402, each DCU selects a DCU master strand (DMS) from the strands executing in the DCU.

In step 404, each DMS subsequently executes the POST code in the DCU global DRAM of the corresponding DCU. Prior to step 406, control of the system is passed from the POST code to the host-config code. In one embodiment of the invention, when control of the system is passed from the POST code to the host-config code, the contents of all DCU global DRAMs in the system is cleared. In step 406, host-config selects the global master strand (GMS) from the DMS master strands. In addition, host-config updates the mailbox interface structures on each of the DCUs such that the DMS executing on the each of the DCUs is able to access its respective mailbox interface structure. In one embodiment of the invention, Step 406 is performed at the beginning of the glued phase. Once step 406 is complete, control of the system is passed back to the GMS to execute its copy of the POST code. At this stage, individual DCUs are provided with a mechanism to enable communication while the system is still executing the POST code. In one embodiment of the invention, once the GMS is selected, the DMSs each query the mailbox interface structure in their DCU to determine whether or not they have NULL reference. If the mailbox interface structure has a NULL reference associated with the DMS, then the DMS is not the GMS. After a DMS determines that it is not the GMS, the DMS waits for a cross-call (discussed below) from the GMS.

In step 408, the GMS loads its copy of the POST code from the corresponding PROM to the DCU global DRAM of the DCU on which the GMS is executing, and sets up memory mailbox structures in the DCU global DRAM of the DCU in which the GMS is executing. In one embodiment of the invention, the memory mailbox structures allow DCUs (or components therein) to communicate with the GMS during POST. In one embodiment of the invention, the memory mailbox structures allow GMS to issue commands to dispatch tests (i.e., tests required during POST) to virtual CPUs. Further, in one embodiment, the mailbox memory structures (i) provide a DRAM stack for all the virtual CPUs, (ii) provide system memory configuration to be tested by the virtual CPUs, (ii) provide information about number of virtual CPUs available in the system configuration such that GMS can determine which tests to dispatch to each of the virtual CPUs in the system, (iv) provide cross-call payload structures to allow inter-processor cross-call communication; (v) provide mutex lock fields structures to support mutex lock requirements for sharing the central resources of the system, and/or (vi) provide data structures required to probe and store input/output configuration.

After the memory mailbox structures are setup in Step 408, the process proceeds to Step 410. In step 410, the GMS obtains (or otherwise determines) a physical address(es) in the DCU global DRAM of the DCU on which the GMS is executing at which: (i) the GMS copy of the POST code is located and (optionally) (ii) the memory mailbox structures are located. In one embodiment of the invention, if the GMS's copy of the POST code and the memory mailbox structures are adjacent, only a single physical address is obtained in Step 410.

In step 412, a payload is determined using a physical address obtained in Step 410. In one embodiment of the invention, the payload is a 64-bit binary representation of the physical address. In step 414, the payload is transmitted by the GMS to each DMS in the system. The process of transmitting the payload is described in FIG. 5.

In step 416, each DMS jumps to the physical address in the DCU global DRAM specified in the payload corresponding to the GMS's copy of the POST code. Each DMS then proceeds to and execute the GMS's copy of the POST code. In step 418, after each DMS obtains the aforementioned copy of POST, the DMSes stop executing their own copies of the POST code. In step 420, each DMS awaits commands communicated from GMS using the memory mailbox structure. At this stage, any DMS in the system may communicate with and/or monitor any other DMS in the system using the memory mailbox structures.

Turning to FIG. 5, in step 500, GMS obtains the number of DCUs in the system (i.e., how many DCUs are in the system). In step 502, the GMS obtains (or otherwise determines) the DMS for each of the DCUs. In step 504, select a GMS from the DMSes determined in step 502. In one embodiment of the invention, selecting the DMS also includes obtaining the address of the DMS. The address of the DMS includes (or may be determined using) the DCU ID, Node ID, and strand ID, where each DCU is uniquely identified by a DCU ID, where each node in a DCU is uniquely identified by the node ID, and where each strand in a node is uniquely identified by a strand ID. In step 506, the payload (i.e., the payload generated in Step 412) to send to DMS is obtained.

In step 508, if all bits in the interrupt receive register in the selected DMS are initially set to zero, then a non-zero bit in payload is selected to send to the DMS. Alternatively, if all bits in the interrupt receive register in the selected DMS are initially set to one, then a zero bit in payload is selected to send to the DMS. Those skilled in the art will appreciate that while the interrupt receive register is described as having zeros and ones, embodiments of the invention may be implemented using bits that each may be assigned to two or more states, such that the payload may be transmitted by encoding the payload by setting each of the bits to one of the two or more states.

In step 510, the interrupt dispatch register in the GMS is programmed with the location of the bit selected in step 508. For example, if the payload is six-four bits in length and the location of the selected bit in the payload is five, then the interrupt dispatch register is programmed with the binary representation of five—i.e., 000101 where the interrupt dispatch register has a width of six bits.

In step 512, a cross-call (an interprocessor call in a system that includes multiple processors) is issued to the selected DMS using the address of the DMS obtained in step 504 and the programmed interrupt dispatch register. Upon receipt of the cross-call by the DMS, the bit corresponding to the location transmitted in the cross-call is set in the interrupt receive register. For example, if the cross-call includes the following payload—000101—then the fifth bit in the interrupt receive register associated with the DMS is set.

In step 514, a determination is made about whether there are additional bits in the payload to send to the DMS. If there are additional bits in the payload to send to the DMS, the process proceeds to step 508; otherwise the process ends.

In step 516, the interrupt dispatch register is programmed with a completion vector. In one embodiment of the invention, the completion vector is 111111 if the interrupt dispatch register has a width of six bits. Those skilled in the art will appreciate that other completion vectors may be used without departing from the invention.

In step 518, a cross-call is issued to the selected DMS using the address of the DMS obtained in step 504 and the programmed interrupt dispatch register. Upon receipt of the cross-call by the DMS, the DMS extracts the payload from its interrupt receive register. The DMS interprets the payload as a physical address. At this stage, the DMS proceeds to Step 416 in FIG. 4.

In one embodiment of the invention, steps 508-518 are performed for each payload transferred to each DMS in the system. Further, steps 508-514 are performed for each bit that is required to set in the payload.

Figure 6:
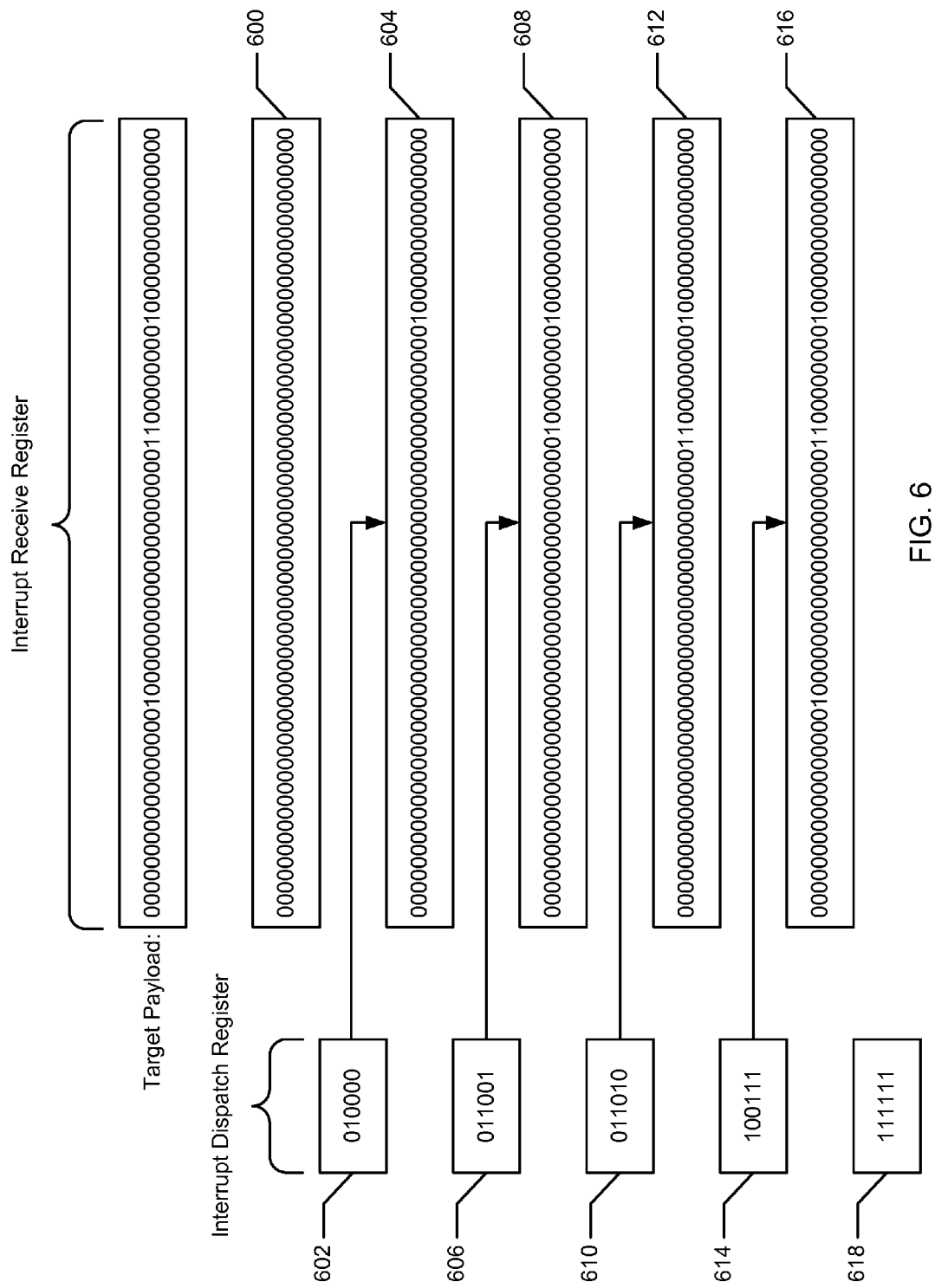
FIG. 6 shows an example in accordance with one or more embodiments of the invention.

FIG. 6 shows an example of transmitting a payload to a DMS using the interrupt dispatch register of the GMS and the interrupt receive register of the DMS. The example is not intended to limit the scope of the invention.

Turning to the example, the consider the scenario in which the physical address of location of the GMS's copy of POST is represented using the following 64-bit binary number: 0000000000000000100000000000000000000110000000-01000000000000000.

Further, assume that all bits in each of the DMS's interrupt receive registers are initially set to zero, that the width of the interrupt dispatch register is six bits, and the width of the interrupt receive register of each DMS is sixty four bits. In order to transmit the above payload to the DMS in accordance with the method shown in FIG. 5, the GMS must send five cross-calls where the last cross-call includes the completion vector.

As shown in FIG. 6, in the initial state all bits in the DMS's interrupt dispatch register are set to zero (600). The interrupt dispatch register for the GMS (602) is set to 010000 (i.e., location 16). Upon receipt of the corresponding cross-call, the bit at location 16 in the interrupt receive register is set to one (604).

The interrupt dispatch register for the GMS (606) is then set to 011001 (i.e., location 25). Upon receipt of the corresponding cross-call, the bit at location 25 in the interrupt receive register is set to one (608). The interrupt dispatch register for the GMS (610) is then set to 011010 (i.e., location 26). Upon receipt of the corresponding cross-call, the bit at location 26 in the interrupt receive register is set to one (612).

The interrupt dispatch register for the GMS (614) is then set to 100111 (i.e., location 39). Upon receipt of the corresponding cross-call, the bit at location 39 in the interrupt receive register is set to one (616). At this stage, the payload has been transferred to the DMS. In order to signal that the entire payload has been transferred, the interrupt dispatch register for the GMS (610) is set to 111111 (i.e., the completion vector). Upon receipt of the corresponding cross-call, the DMS obtains the payload from its interrupt dispatch register and proceeds to step 416 in FIG. 4.

Those skilled in the art will appreciate that while the individual non-zero bits are transmitted to the interrupt receive register of the DMS starting at the least significant non-zero bit, the order in which the individual non-zero bits (or zero bits if all bits in the interrupt receive register are initially set to one) may be selected at random or in any other order without departing from the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a first distributed computing unit (DCU) comprising:
 a first node; and
 a first DCU master strand (DMS) located on the first node, wherein the first DMS is associated with a first interrupt receive register;
a second DCU comprising:
 a second node;
 a global master strand (GMS) located on the second node, wherein the GMS is associated with an interrupt dispatch register; and
 a DCU global memory comprising first power-on self test (POST) code at a first physical address;
wherein the GMS is configured to:
 identify the first DMS;
 determine a first address for the first DMS;
 determine a payload to transmit to at least the first DMS using at least the first physical address, wherein the payload comprises a sequentially ordered set of bits, wherein at least two bits in the payload are non-zero;
 select a first non-zero bit in the payload to send to the first DMS;
 determine a first bit-location of the first non-zero bit in the payload;
 program the interrupt dispatch register with the first bit-location to obtain a first programmed interrupt dispatch register;
 issue a cross-call comprising the first bit-location to the first address for the first DMS using the first programmed interrupt dispatch register;
 select a second non-zero bit in the payload to send to the first DMS;
 determine a second bit-location of the second non-zero bit in the payload;
 program the interrupt dispatch register with the second bit-location to obtain a second programmed interrupt dispatch register;
 issue a cross-call comprising the second bit-location to the first address for the first DMS using the second programmed interrupt dispatch register;
 after the first non-zero bit and the second non-zero bit in the payload have been transmitted to the first DMS, program the interrupt dispatch register with a completion vector to obtain a third programmed interrupt dispatch register; and
 issue a cross-call comprising the completion vector to the first address for the first DMS using the third programmed interrupt dispatch register;
wherein the first DMS is configured to:
 set the first bit-location in the first interrupt receive register to one;
 set the second bit-location in the first interrupt receive register to one; and
 after receiving the completion vector, use a current state of the first interrupt receive register to determine the first physical address.

2. The system of claim 1, further comprising:
a third DCU comprising:
 a third node; and
 a second DMS located on the third node, wherein the second DMS is associated with a second interrupt receive register;
wherein the GMS is further configured to:
 identify the second DMS;
 determine a second address for the second DMS;
 issue a plurality of cross-calls using the interrupt dispatch register to the second address, wherein one of the plurality of cross-calls is issued for each non-zero bit in the payload; and
 issue a cross-call comprising a completion vector to the second address;

wherein the third DCU is configured to:
receive the plurality of cross-calls from the GMS;
in response to each of the plurality of cross-calls, set a corresponding bit-location in the second interrupt receive register to one;
after receiving the completion vector, use a current state of the second interrupt receive register to determine the first physical address.

3. The system of claim 1, wherein prior to determining the first physical address the first DCU was not executing the first POST code and the first DCU was executing a second POST code from PROM located the first DCU.

4. The system of claim 3, wherein after determining the first physical address, the first DCU obtains a copy of the first POST code and executes the copy of the first POST code.

5. The system of claim 1, wherein the first address for the first DMS comprises an ID associated with the first DCU, an ID associated with the first node, and an ID associated with the first DMS.

6. The system of claim 1, wherein the interrupt dispatch register is six bits wide and wherein the interrupt receive register is sixty-four bits wide.

7. The system of claim 1, wherein the DCU global memory is random access memory and is accessible to all DCUs in the system.

8. The system of claim 1, wherein host-config code executing on the system determines the GMS and wherein the second DCU is a lowest numbered active DCU in the system.

9. A system, comprising:
a first distributed computing unit (DCU) comprising:
a first node; and
a first DCU master strand (DMS) located on the first node, wherein the first DMS is associated with a first interrupt receive register;
a second DCU comprising:
a second node;
a global master strand (GMS) located on the second node, wherein the GMS is associated with an interrupt dispatch register; and
a DCU global memory comprising first power-on self test (POST) code and a memory mailbox structure at a physical address;
wherein the GMS is configured to:
identify the first DMS;
determine an address for the first DMS;
determine a payload to transmit to at least the first DMS using at least the physical address, wherein the payload comprises a sequentially ordered set of bits, wherein the payload comprises at least one non-zero bit;
issue a plurality of cross-calls using the interrupt dispatch register to the address for the first DMS, wherein one of the plurality of cross-calls is issued for each non-zero bit in the payload; and
issue a cross-call comprising a completion vector;
wherein the first DCU is configured to:
receive the plurality of cross-calls from the GMS;
in response to each of the plurality of cross-calls, set a corresponding bit-location in a second interrupt receive register to one;
after receiving the completion vector, use a current state of the second interrupt receive register to determine the physical address.

10. The system of claim 9, wherein the first DCU, after determining the physical address, communicates with the second DCU using the memory mailbox structure.

11. The system of claim 9, wherein the first POST code is obtained from a first PROM in the second DCU, and wherein prior to the first DCU determining the physical address, the first DCU executes a second POST code obtained from a second PROM in the first DCU.

12. The system of claim 11, wherein the first DCU stops executing the second POST code obtained from the second PROM in the first DCU after determining the physical address and jumps to the physical address.

13. The system of claim 9, wherein the GMS issues the plurality of cross-calls after the GMS enters a glued-phase in POST.

* * * * *